US012005668B2

(12) United States Patent
Kitamura

(10) Patent No.: US 12,005,668 B2
(45) Date of Patent: Jun. 11, 2024

(54) CARTON PRODUCTION METHOD

(71) Applicant: KYOTO SEISAKUSHO CO., LTD., Kyoto (JP)

(72) Inventor: Motoyuki Kitamura, Kyoto (JP)

(73) Assignee: KYOTO SEISAKUSHO CO., LTD., Kyoto (JP)

( * ) Notice: Subject to any disclaimer, the term of this patent is extended or adjusted under 35 U.S.C. 154(b) by 50 days.

(21) Appl. No.: 17/920,138

(22) PCT Filed: Feb. 25, 2021

(86) PCT No.: PCT/JP2021/007130
§ 371 (c)(1),
(2) Date: Oct. 20, 2022

(87) PCT Pub. No.: WO2021/220600
PCT Pub. Date: Nov. 4, 2021

(65) Prior Publication Data

US 2023/0158767 A1 May 25, 2023

(30) Foreign Application Priority Data

Apr. 27, 2020 (JP) ................................ 2020-078226

(51) Int. Cl.
*B31B 50/62* (2017.01)
*B31B 50/26* (2017.01)
(Continued)

(52) U.S. Cl.
CPC .............. *B31B 50/62* (2017.08); *B31B 50/26* (2017.08); *B31B 50/624* (2017.08); *B31B 2100/0024* (2017.08); *B65D 5/4208* (2013.01)

(58) Field of Classification Search
CPC ..... B31B 50/62; B31B 50/624; B31B 50/622; B65D 5/4208
See application file for complete search history.

(56) References Cited

U.S. PATENT DOCUMENTS 2,874,870 A * 2/1959 Collura .................. B65D 71/30 229/117.14
3,535,987 A * 10/1970 Morse ..................... B31B 50/64 493/134
(Continued)

FOREIGN PATENT DOCUMENTS

JP S51104979 A 9/1976
JP H04067031 U 6/1992
(Continued)

OTHER PUBLICATIONS

International Search Report for International Application No. PCT/JP2021/007130; dated May 18, 2021.

*Primary Examiner* — Christopher R Harmon

(74) *Attorney, Agent, or Firm* — CANTOR COLBURN LLP

(57) ABSTRACT

Provided is a carton production method capable of preventing quality deterioration which may happen during the sealing due to adhesion of an adhesive. This method comprises: a first insertion step K1 of rotating the lid body toward the one side surface of the box body to a position where the inserting flap overlaps the suspension hole; an application step K2 of applying an adhesive to the inserting flap through the suspension hole; a second insertion step K3 of curving the one side surface of the box body inserting the insertion flap and closing the upper surface of the box body with the lid body; and an adhesion step K4 of bonding the inserting flap to the inside of the one side surface of the box body.

2 Claims, 10 Drawing Sheets

(51) Int. Cl.
*B65D 5/42* (2006.01)
*B31B 100/00* (2017.01)

(56) References Cited

U.S. PATENT DOCUMENTS

| | | | | | |
|---|---|---|---|---|---|
| 4,291,807 | A * | 9/1981 | Giordano | B65D 5/5435 229/152 |
| 4,457,431 | A * | 7/1984 | Lundquist | B65D 5/42 229/162.1 |
| 4,567,711 | A * | 2/1986 | Hodnett | B65B 61/02 53/128.1 |
| 4,858,756 | A * | 8/1989 | Herrin | B65D 5/4208 206/461 |
| 2016/0096651 | A1* | 4/2016 | Klein | B31B 50/62 229/117.14 |
| 2016/0243784 | A1* | 8/2016 | Ishizuka | B31B 50/042 |

FOREIGN PATENT DOCUMENTS

| | | | |
|---|---|---|---|
| JP | 3072763 | U | 11/2000 |
| JP | 2005263270 | A | 9/2005 |
| JP | 2015209237 | A | 11/2015 |

* cited by examiner

CARTON PRODUCTION METHOD

CROSS REFERENCE TO RELATED APPLICATIONS

This is the U.S. national stage of application No. PCT/JP2021/007130, filed on Feb. 25, 2021. Priority under 35 U.S.C. § 119(a) and 35 U.S.C. § 365(b) is claimed from Japanese Application No. 2020-078226, filed Apr. 27, 2020, the disclosure of which is also incorporated herein by reference.

TECHNICAL FIELD

The present invention relates to a carton production method.

BACKGROUND ART

Conventionally, there has been known a carton including a box body having an upper surface that is opened, a suspension piece extending upward from an upper end of one side surface of the box body, and a lid body that closes the upper surface of the box body, and provided with an inserting flap that is directed toward the one side surface of the box body to be inserted in the inner side of the box body.

There is a situation where such a carton is subjected to a process of applying an adhesive, such as a hot melt adhesive, to the inserting flap to seal the opening of the box body using the inserting flap in order to prevent "falsification", that is, an act of opening the lid body, replacing or picking out a product stored in the box body or putting a foreign object in the box body, for example, and then closing the lid body.

However, for a carton including a suspension piece for suspending the carton, the suspension piece intervenes between a nozzle for discharging the adhesive and the inserting flap and hinders application of the adhesive to the inserting flap. This makes is difficult to apply the adhesive to the inserting flap.

In this regard, for such a carton including a suspension piece, Patent Literature 1 discloses a technique of using a suspension hole created in a suspension piece to apply an adhesive to an inserting flap via a nozzle in a relatively easy manner.

CITATION LIST

Patent Literature

Patent Literature 1: JP-U 3072763 Gazette

SUMMARY OF INVENTION

Technical Problems

A packing box described in Patent Literature 1 includes side plates (second side surface and third side surface) provided at both edges of a front plate (one side surface of a box body), a back plate (another side surface of the box body) provided at one side edge of one of the side plates, an upper lid piece (lid body) connected to an upper end of the back plate, and an insertion piece (inserting flap) connected to the upper lid piece. A hanging piece (suspension piece) extends from an upper end of the front plate, and an opening (suspension hole) is created in a lower end portion of the hanging piece so as to touch a boundary between the hanging piece and the front plate.

In the packing box, the insertion piece is mountain-folded at a folding line (line for folding), and the insertion piece is inserted in the inner side of the front plate.

In the process of inserting the insertion piece in the inner side of the front plate, a glue (adhesive) is applied to the insertion piece through the opening. Then, the insertion piece is further inserted, and the insertion piece and the inner side of the front plate are bonded and sealed.

However, in the packing box described in Patent Literature 1, the adhesive applied to the inserting flap may adhere to the suspension piece and one side surface of the box body when the inserting flap is inserted, which may deteriorate the quality of the carton.

In addition, when applying the adhesive through the suspension hole, the adhesive may adhere to the suspension piece due to an erroneous timing of discharging the adhesive or stringing of the applied adhesive, which may deteriorate the quality of the carton.

The present invention has been made in view of such problem. An object of the present invention is to provide a carton production method that can provide sealing to a carton having a suspension piece with an effect of preventing falsification, and at the same time prevent quality deterioration which may happen during the sealing due to adhesion of an adhesive to the suspension piece and one side surface of the box body.

Solutions to Problems

The problem to be solved by the present invention is as described above, and means for solving the problem will be described below.

That is, one aspect of the present invention is a carton production method for a carton including a box body having an upper surface that is opened, a suspension piece extending upward from an upper end of one side surface of the box body, a lid body that is provided so as to be rotatable about an upper end of another side surface of the box body and closes the upper surface of the box body, an inserting flap provided to the lid body and on an opposite side of the upper end of the another side surface of the box body, so as to be inserted in an inner side of the one side surface of the box body, and a suspension hole penetrating the suspension piece, the method including a first insertion step of rotating the lid body toward the one side surface of the box body to a position where the inserting flap overlaps the suspension hole, an application step of applying an adhesive to the inserting flap through the suspension hole, a second insertion step of curving the one side surface of the box body so as to protrude away from the inserting flap, inserting the insertion flap, and closing the upper surface of the box body with the lid body, and an adhesion step of bonding the inserting flap, to which the adhesive is applied, to the inside of the one side surface of the box body.

In this carton production method according to one aspect of the present invention, the adhesive applied to the inserting flap will not adhere to the suspension piece and the inside of the one side surface of the box body when the inserting flap is inserted. This prevents quality deterioration due to adhesion of the adhesive to the suspension piece and the one side surface of the box body.

Another aspect of the present invention is a carton production method in which, in the application step, the adhesive is discharged from a tip of a nozzle positioned on a side opposite to the inserting flap with respect to the suspension piece toward the inserting flap through the suspension hole, and a separation distance between the tip of the nozzle and the inserting flap is 5 mm or less.

In this carton production method according to another aspect of the present invention, the adhesive can be easily applied to the inserting flap without causing a contact of the adhesive with an edge of the suspension hole. This prevents quality deterioration due to adhesion of the adhesive to the suspension piece.

Advantageous Effects of Invention

The present invention described above can provide a carton production method that can provide sealing to a carton having a suspension piece with an effect of preventing falsification, and at the same time prevent quality deterioration which may happen when creating the sealing due to adhesion of an adhesive to the suspension piece and one side surface of a box body.

DESCRIPTION OF EMBODIMENT

An embodiment of the present invention will be described below with reference to the drawings.

Figure 9:
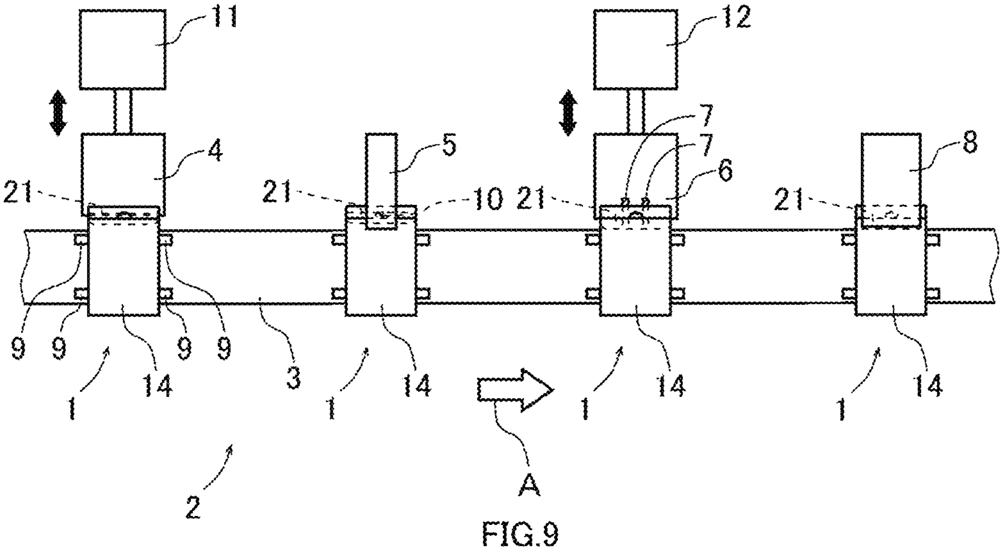
FIG. 9 is a schematic plan view illustrating the carton production method.

In the following description, for convenience, the direction indicated by arrow A in FIG. 9 is defined as a conveyance direction of a carton 1.

As illustrated in FIG. 9, in the present embodiment, a carton conveyance unit 2 that conveys the carton 1 is provided, and along a conveyance path 3, a first pushing member 4, an adhesive applicator 5, a second pushing member 6, a claw member 7, and a pusher 8 are provided in this order.

The carton 1 is expanded from a folded flat form (carton blank) into a box shape, and is then conveyed in such an orientation that a first side surface 14 is an upper surface. The conveyed carton 1 is fixed by a plurality of fixing members 9. How the carton 1 is fixed is not particularly limited, and any appropriate fixing method can be used. The carton 1 is conveyed continuously by continuous conveyance. How the carton 1 is conveyed is not particularly limited. The carton 1 may be conveyed intermittently by pitch conveyance.

The first pushing member 4 pushes a lid body 20 (see FIG. 1) of the carton 1 to a position where an adhesive 10 can be applied. The first pushing member 4 is linked to a first driving device 11. The first driving device 11 operates to move the first pushing member 4 toward or away from the conveyance path 3. The first pushing member 4 is driven to move toward the conveyance path 3 when the conveyed carton 1 passes, whereby the lid body 20 is pushed in.

The adhesive applicator 5 applies the adhesive 10 to an inserting flap 21 of the carton 1. The adhesive applicator 5 is, for example, a hot melt applicator, and discharges a hot melt adhesive from a nozzle 28 (see FIG. 6A). A sensor (not illustrated) or the like detects presence or absence of the conveyed carton 1. When presence of the conveyed carton 1 is detected, the nozzle 28 discharges the adhesive 10 toward the inserting flap 21.

Note that the adhesive 10 is not limited to a hot melt adhesive, and can be appropriately selected according to, for example, the material of the carton 1.

The second pushing member 6 pushes the lid body 20 to a position where the lid body 20 closes the upper surface of the box body 13 (see FIG. 1) of the carton 1. The second pushing member 6 is linked to a second driving device 12. The second driving device 12 operates to move the second pushing member 6 toward or away from the conveyance path 3. The second pushing member 6 is driven to move toward the conveyance path 3 when the conveyed carton 1 passes, whereby the lid body 20 is pushed in.

A claw member 7 curves the first side surface 14 to protrude away from the inserting flap 21. The claw member 7 is fixed to the second pushing member 6. Two claw members 7 are provided so as to point their tips between the inserting flap 21 and the first side surface 14. Like the second driving device 12, the claw members 7 move toward or away from the conveyance path 3, operated by the second driving device 12. In addition, the claw members 7 are configured to move, after being inserted in the carton 1 from between the inserting flap 21 and the first side surface 14, away from the inserting flap 21. With this movement, the claw members 7 curve the first side surface 14 to protrude away from the inserting flap 21.

After the claw members 7 that have curved the first side surface 14 to protrude away from the inserting flap 21 are removed, the pusher 8 presses the first side surface 14 toward the inserting flap 21. When the carton 1 passes, the pusher 8 presses a portion of the first side surface 14 toward the inserting flap 21, in which the portion is overlapping the surface, to which the adhesive 10 has been applied, of the inserting flap 21. This reliably bond the inserting flap 21 to the inside of the first side surface 14.

Next, the carton 1 will be described with reference to FIG. 1 and FIG. 2. The carton 1 accommodates a product or the like which is an object to be packed. The carton 1 of the present embodiment is made of paper, for example.

Figure 1:
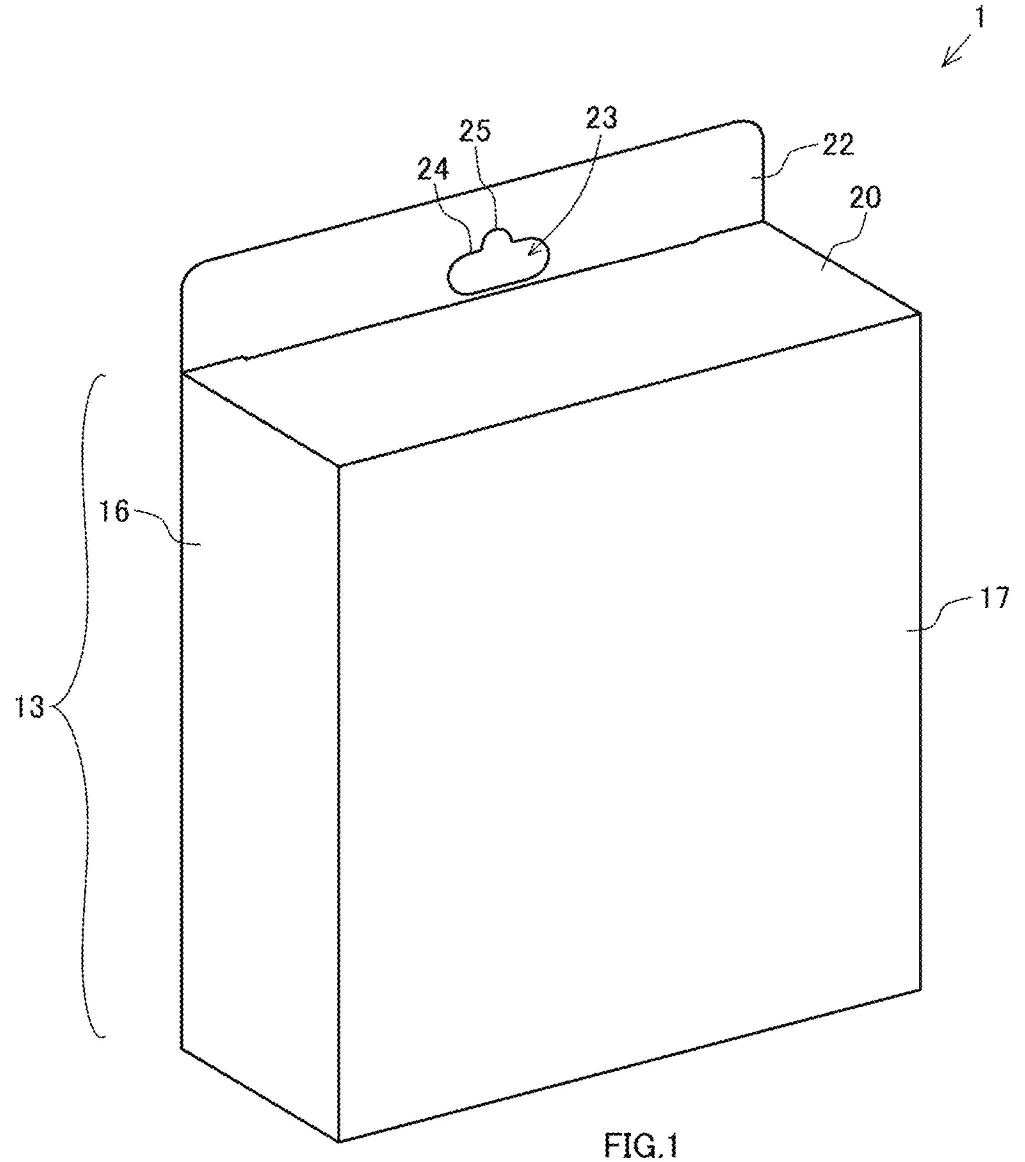
FIG. 1 is a perspective view illustrating an overall configuration of a carton according to an embodiment of the present invention.
Figure 2:
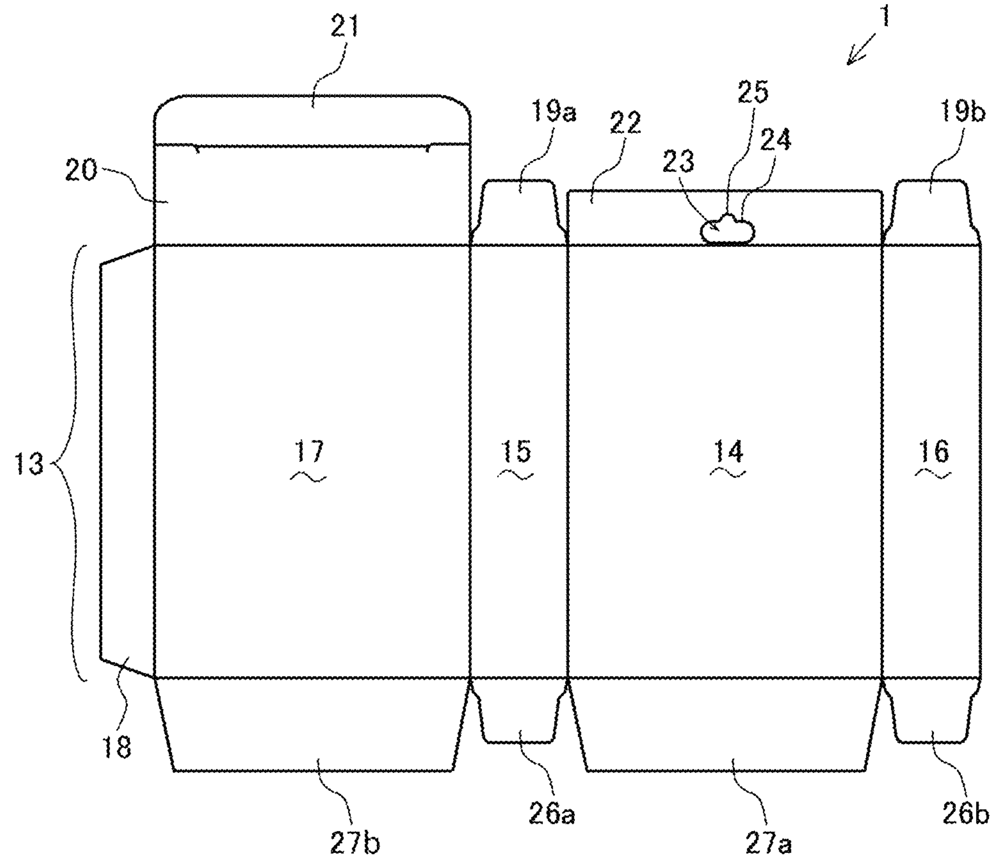
FIG. 2 is an exploded view illustrating the overall configuration of the carton according to an embodiment of the present invention.

As illustrated in FIG. 1 and FIG. 2, the carton 1 includes a quadrangular sleeve-shaped box body 13 whose upper surface and lower surface are opened. The box body 13 includes the first side surface 14 which is one side surface of the box body 13, a second side surface 15 and a third side surface 16 positioned on both sides of the first side surface 14 to oppose each other, and a fourth side surface 17 which is the other side surface of the box body 13 and faces the first side surface 14. The fourth side surface 17, the second side surface 15, the first side surface 14, and the third side surface 16 are provided in series with fold lines each between adjacent ones of the surfaces. The fourth side surface 17 and the third side surface 16 are joined via a gluing piece 18 extending from the fourth side surface 17 via a fold line.

On the upper end of the box body 13, a side flap 19*a* connected to the upper end of the second side surface 15 via a fold line and a side flap 19*b* connected to the upper end of the third side surface 16 via a fold line are provided. Also provided are a lid body 20 connected to the upper end of the fourth side surface 17 via a fold line, and the inserting flap 21 connected, via a fold line, to the lid body 20 on a side opposite to the upper end of the fourth side surface 17 of the box body 13.

The side flap 19*a* is rotated toward the inside of the box body 13 about the fold line at the upper end of the second side surface 15. The side flap 19*b* is rotated toward the inside of the box body 13 about the fold line at the upper end of the third side surface 16.

Then, the lid body 20 is rotated toward the first side surface 14 about the fold line at the upper end of the fourth side surface 17 to close the upper surface of the box body 13. In this action, the inserting flap 21 is rotated toward the first side surface 14 about the fold line between the lid body 20 and the insertion flap 21, and is inserted in the inner side of the first side surface 14.

A suspension piece 22 extending upward from the upper end of the first side surface 14 is provided at the upper end of the box body 13. A suspension hole 23 penetrating the suspension piece 22 is provided at the center of the lower end portion of the suspension piece 22.

The carton 1 can be used in a suspended state by putting a hook or the like through the suspension hole 23. The suspension hole 23 has such a shape that is a combination of a long hole 24 extending in a width direction of the suspension piece 22 and a semicircular hole 25 provided at the upper center of the long hole 24 to allow the semicircular hole 25 to engage with a hook or the like.

On the lower end portion of the box body 13, a bottom flap 26*a* connected to the lower end of the second side surface 15 via a fold line and a bottom flap 26*b* connected to the lower end of the third side surface 16 via a fold line are provided. Also provided are a bottom part 27*a* connected to the lower end of the first side surface 14 via a fold line, and a bottom part 27*b* connected to the lower end of the fourth side surface 17 via a fold line.

The bottom flap 26*a* is rotated toward the inside of the box body 13 about the fold line at the lower end of the second side surface 15. The bottom flap 26*b* is rotated toward the inside of the box body 13 about the fold line at the lower end of the third side surface 16.

Then, the bottom part 27*a* is rotated toward the bottom flaps 26*a* and 26*b* about the fold line at the lower end of the first side surface 14. The bottom part 27*b* is rotated toward the bottom part 27*a* about the fold line at the lower end of the fourth side surface 17. The bottom part 27*a* and the bottom part 27*b* are bonded to each other with an adhesive, whereby the opening of the lower end portion of the box body 13 is sealed.

Next, a method for producing the carton 1 will be described with reference to FIGS. 3 to FIG. 8.

Figure 5A:
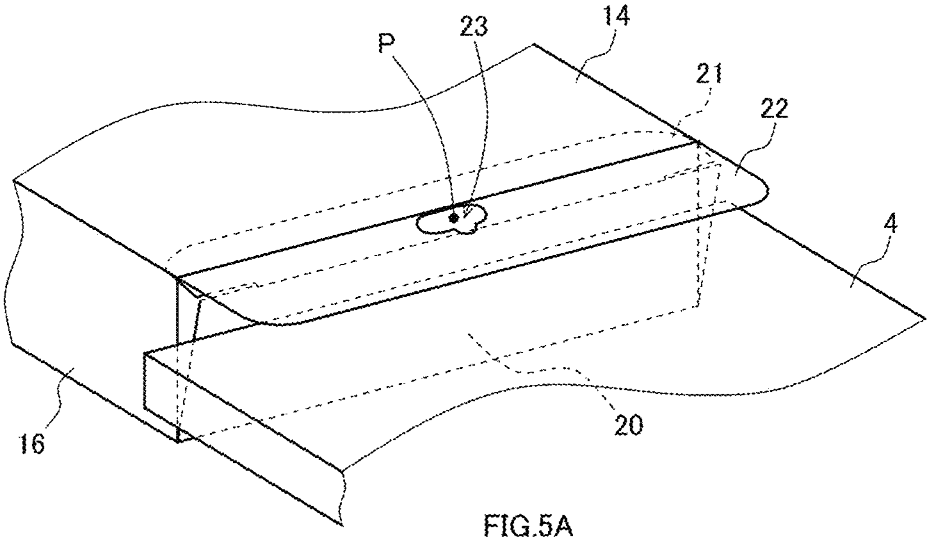
FIG. 5A is a perspective view illustrating the carton in the first insertion step.
Figure 5B:
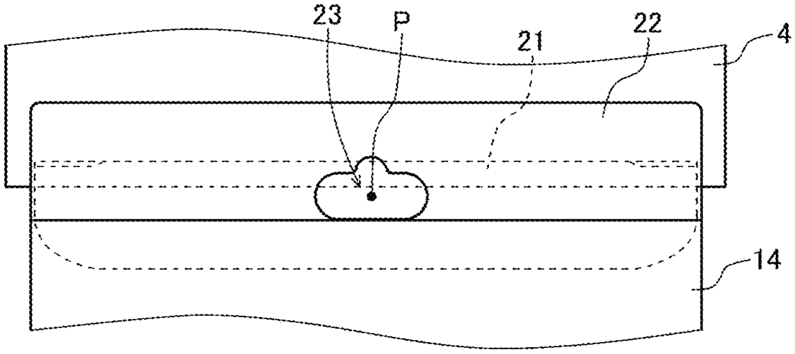
FIG. 5B is a plan view illustrating the carton in the first insertion step.
Figure 5C:
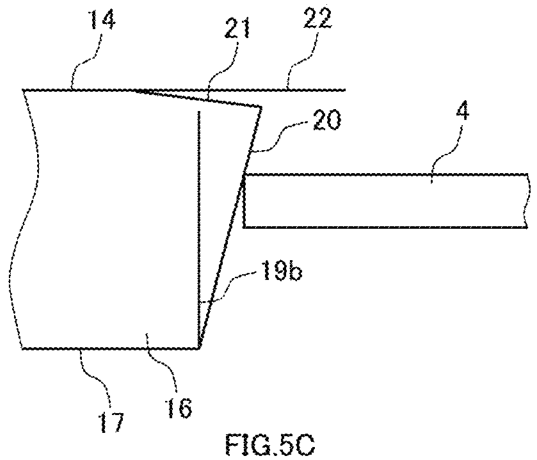
FIG. 5C is a side view illustrating the carton in the first insertion step.
Figure 6A:
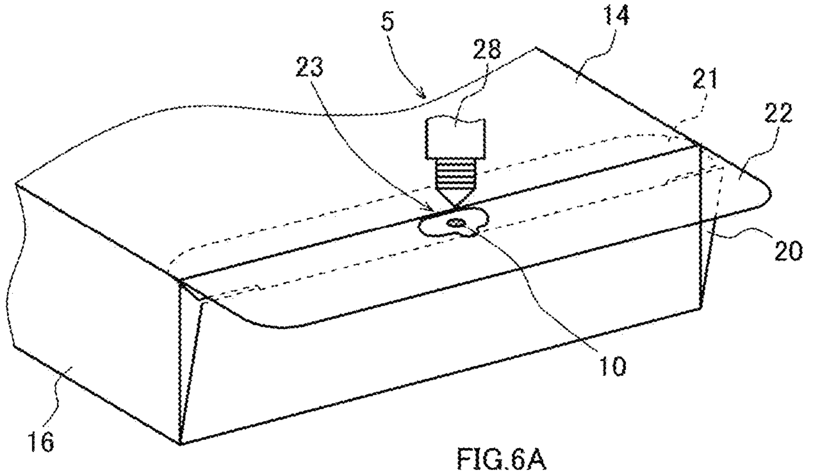
FIG. 6A is a perspective view illustrating the carton in an application step.
Figure 6B:
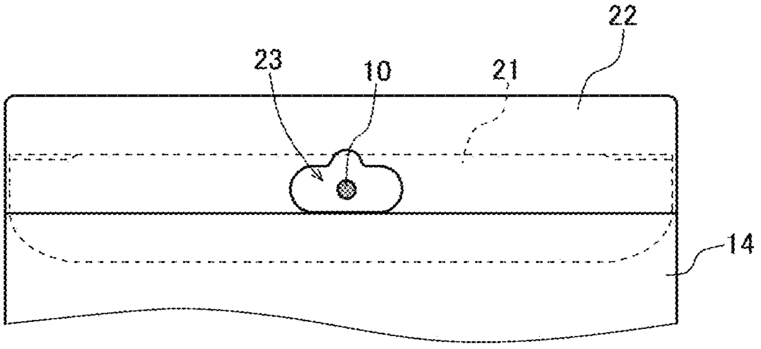
FIG. 6B is a plan view illustrating the carton in the application step.
Figure 7A:
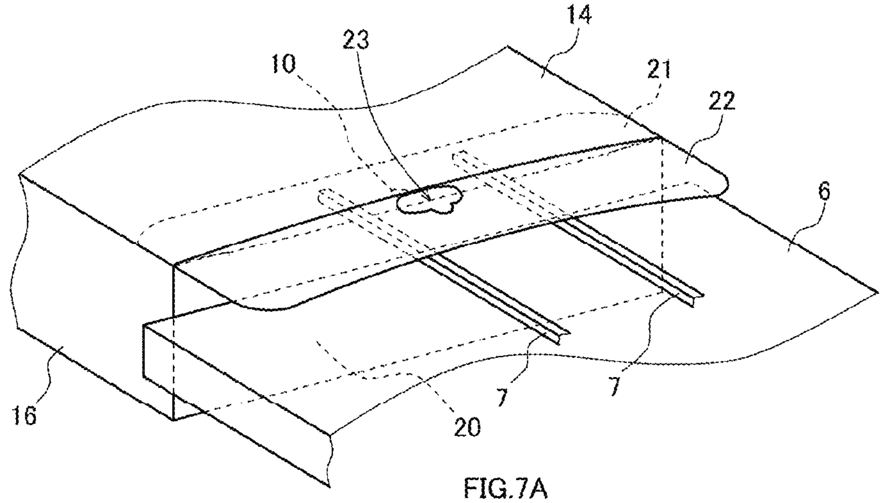
FIG. 7A is a perspective view illustrating the carton in a second insertion step.
Figure 7B:
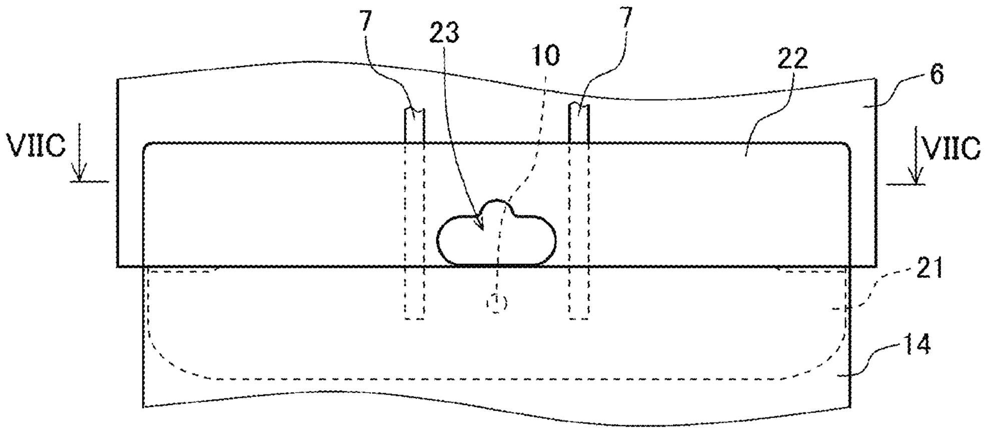
FIG. 7B is a plan view illustrating the carton in the second insertion step.
Figure 7C:
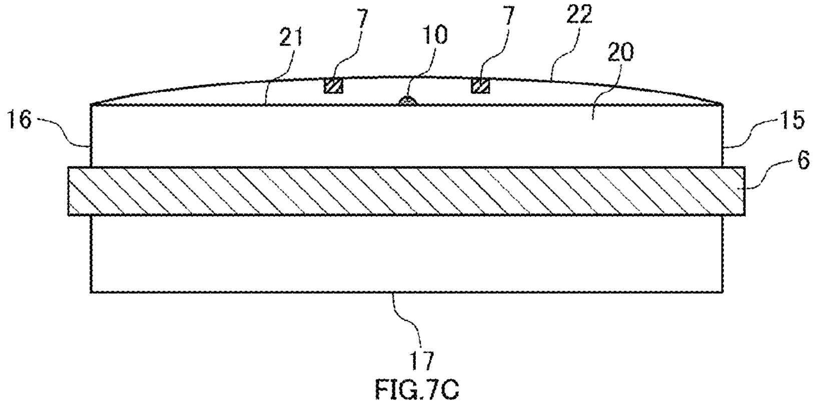
FIG. 7C is a view illustrating the carton in the second insertion step, the view being a cross-sectional view as viewed in a direction indicated by arrows VIIC in FIG. 7B.
Figure 8:
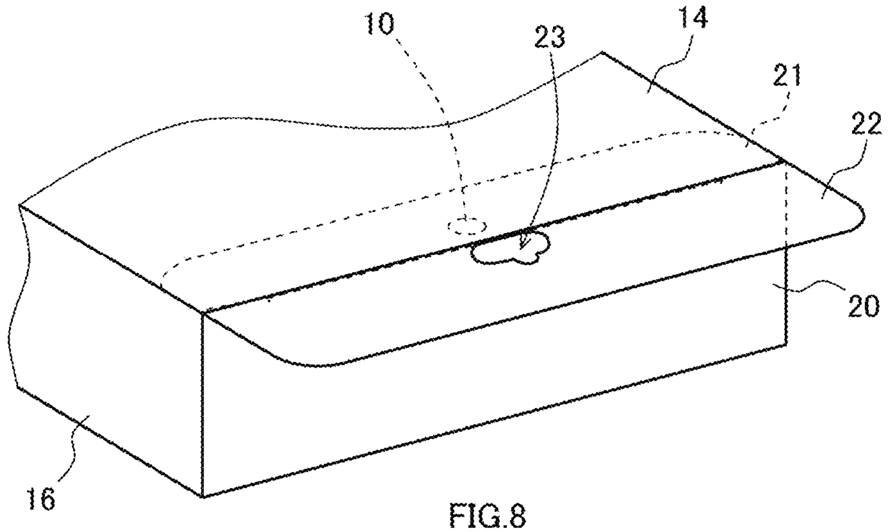
FIG. 8 is a perspective view illustrating the carton in an adhesion step.

Note that illustration of the conveyance path 3 is omitted in FIGS. 4 to FIG. 8, illustration of the nozzle 28 is omitted in FIG. 6B, and illustration of the pusher 8 is omitted in FIG. 8.

Figure 3:
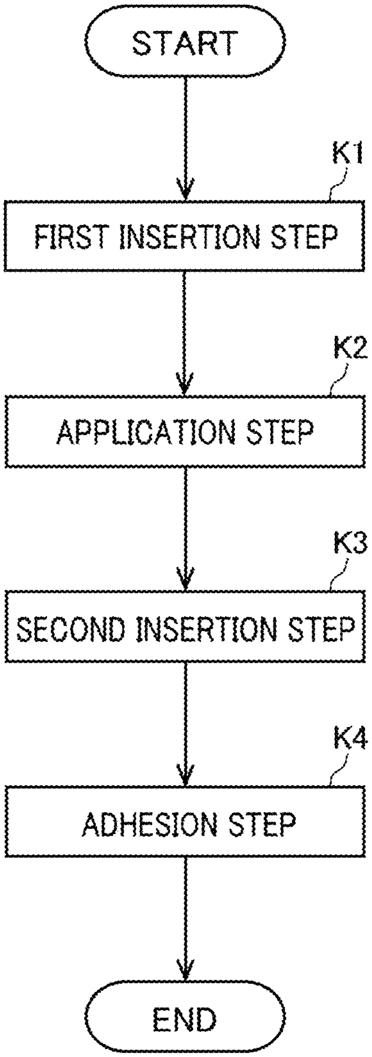
FIG. 3 is a flowchart illustrating a carton production method according to an embodiment of the present invention.

As illustrated in FIG. 3, the method for producing the carton 1 includes a first insertion step K1, an application step K2, a second insertion step K3, and an adhesion step K4.

Figure 4:
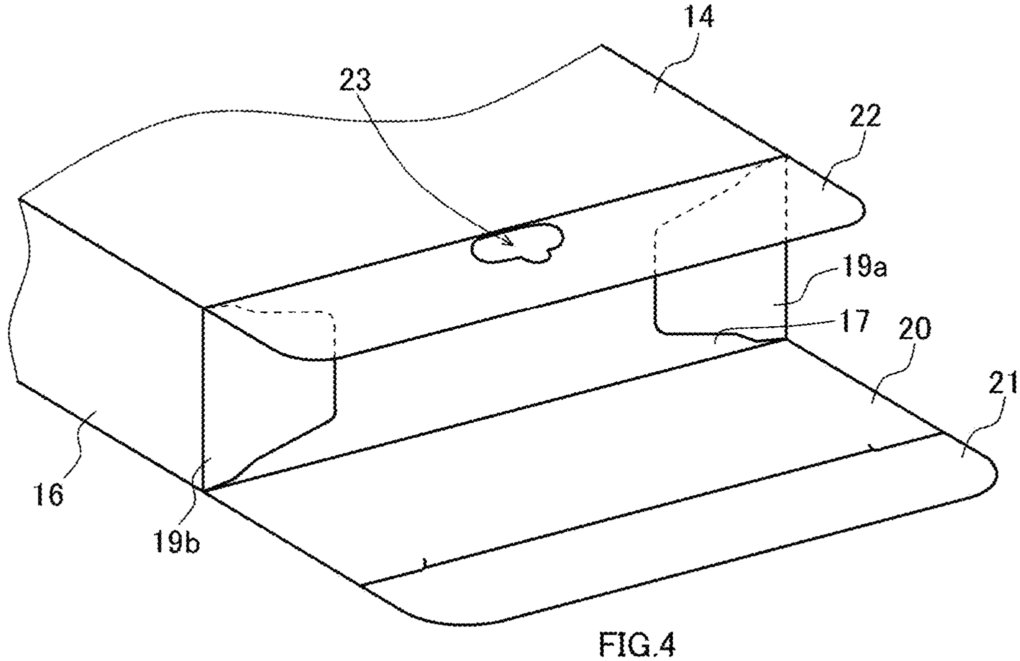
FIG. 4 is a perspective view illustrating the carton before performing a first insertion step.

As illustrated in FIG. 4, the carton 1 is expanded from a folded flat form (carton blank) into a box shape before the first insertion step K1 is performed. While the carton 1 is conveyed by the carton conveyance unit 2 (see FIG. 9), an object to be packed is put into the carton 1, and the side flaps 19*a* and 19*b* are rotated toward the inside of the box body 13.

In the first insertion step K1 as illustrated in FIGS. 5A, FIG. 5B, and FIG. 5C, the lid body 20 is rotated toward the first side surface 14 to a position where the inserting flap 21 overlaps the suspension hole 23. The inserting flap 21 (see FIG. 4) horizontally projecting from the lid body 20 is rotated toward the first side surface 14 by a guide (not illustrated). In a similar manner, the lid body 20 horizontally projecting from the fourth side surface 17 is rotated toward the first side surface 14 by a guide (not illustrated). Then, the first pushing member 4 pushes the lid body 20 to the inside of the box body 13, whereby the inserting flap 21 slides against the suspension piece 22 and the first side surface 14 to be inserted.

For example, the first pushing member 4 pushes the lid body 20 until a position P on the surface to which the adhesive 10 is applied comes to the central portion of the suspension hole 23 in a plan view.

Figure 6C:
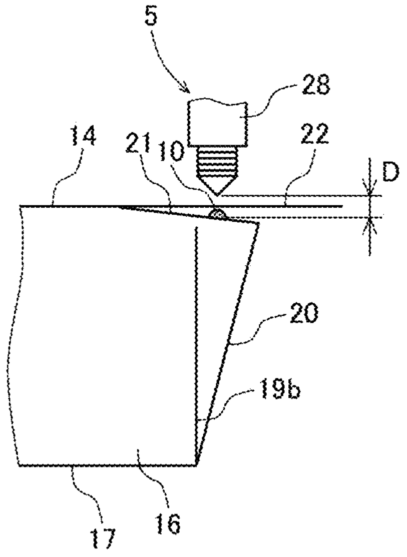
FIG. 6C is a side view illustrating the carton in the application step.

In the application step K2 as illustrated in FIGS. 6A, FIG. 6B, and FIG. 6C, the adhesive 10 is applied to the inserting flap 21 through the suspension hole 23. The nozzle 28 is positioned on the side opposite to the inserting flap 21 with respect to the suspension piece 22, and discharges the adhesive 10 from the tip of the nozzle 28 toward the insertion flap 21 through the suspension hole 23. The nozzle 28 discharges the adhesive 10 through, for example, the central portion of the suspension piece 22. The nozzle 28 preferably has a separation distance D of 5 mm or less between the tip of the nozzle 28 and the inserting flap 21. This is based on the idea derived through extensive studies by the inventor of the present application that an excessively large separation between the nozzle 28 and the inserting flap 21 (an excessively large separation distance D) may cause a defect due to stringing of the adhesive 10 discharged from the nozzle 28, that is, a string of adhesive adhering to the suspension piece, in particular, to the edge of the suspension hole, where application of the adhesive is not necessary, whereas a separation distance D of 5 mm or less greatly reduces such a defect.

Note that the carton conveyance unit 2 (see FIG. 9) recognizes the position of the conveyed carton 1, and based on the position, the adhesive 10 is discharged toward the inserting flap 21 of the passing carton 1. However, the present invention is not limited to this configuration, and for example, the suspension hole 23 may be recognized using image recognition, and the adhesive 10 may be discharged toward the central portion of the recognized suspension hole 23.

To apply the adhesive 10 by an amount that manifests a sufficient bond strength, the discharge amount of the adhesive 10 is determined in advance according to the material of the carton 1, the viscosity of the adhesive 10, the discharge velocity from the nozzle 28, and the like.

In the second insertion step K3 as illustrated in FIGS. 7A, FIG. 7B, and FIG. 7C, the first side surface 14 is curved to protrude away from the inserting flap 21 to insert the inserting flap 21, and the upper surface of the box body 13 is closed with the lid body 20. The two claw members 7 opposing each other with the suspension hole 23 therebetween are inserted along the inside of the first side surface 14 in the carton 1. The claw members 7 are moved away from the inserting flap 21 to curve the first side surface 14 to such an extent that the adhesive 10 will not touch the first side surface 14. In this action, the suspension piece 22 is also curved with the first side surface 14. While the first side surface 14 and the suspension piece 22 are curved to such an extent that the adhesive 10 will not touch the first side surface 14 and the suspension piece 22, the second pushing member 6 pushes the lid body 20 to a position where the lid body 20 closes the upper surface of the box body 13.

The number, arrangement, and shape of the claw members 7 are not limited to those illustrated in the drawings. The claw members 7 may be configured in an appropriate number, arrangement, and shape. For example, the number, arrangement, and shape of the claw members 7 may be changed according to the material and dimension of the carton 1 so as not to leave a mark made by curving on the first side surface 14. A suction member (not illustrated) that sucks the outer side of the first side surface 14 may be provided to pull the first side surface 14 by the suction member so as to protrude away from the inserting flap 21, thereby curving the first side surface 14.

In the adhesion step K4 as illustrated in FIG. 8, the inserting flap 21 to which the adhesive 10 is applied is bonded to the inside of the first side surface 14. The pusher 8 (see FIG. 9) presses a portion of the first side surface 14 toward the inserting flap 21, in which the portion is overlapping the surface, to which the adhesive 10 has been applied, of the inserting flap 21.

In the method for producing the carton 1 according to the present invention, the adhesive 10 applied to the inserting flap 21 will not adhere to the suspension piece 22 nor to the first side surface 14 when the inserting flap 21 is inserted. This prevents quality deterioration due to adhesion of the adhesive 10 to the suspension piece 22 and the first side surface 14.

Furthermore, since the adhesive 10 is applied to the inserting flap 21 through the suspension hole 23, the inserting flap 21 can be bonded to the inside of the first side surface 14 by simply further inserting the lid body 20 that has already been inserted halfway. This allows, when the adhesive 10 is a hot melt adhesive, immediately performing bonding before the adhesive 10 solidifies. Furthermore, in a case where the carton 1 is continuously conveyed, the inserting flap 21 to which the adhesive 10 is applied can be easily inserted even when the carton 1 is moving.

According to the method of producing the carton 1 and the carton 1 according to the present invention, the adhesive 10 can be easily applied to the inserting flap 21 without the adhesive 10 touching an edge of the suspension hole 23. This prevents quality deterioration due to adhesion of the adhesive 10 to the suspension piece 22.

Lastly, the carton 1 of the present invention is not limited to the embodiment described above, and the material, and the shape, arrangement, and the like of the members (inserting flap 21, suspension piece 22, suspension hole 23, and the like) may be appropriately changed.

INDUSTRIAL APPLICABILITY

The present invention can be used for a carton including a box body having an upper surface that is opened, a suspension piece extending upward from an upper end of one side surface of the box body, and a lid body that closes the upper surface of the box body, and provided with an inserting flap that is directed toward the one side surface of the box body to be inserted in the inner side of the box body.

REFERENCE SIGNS LIST

1 carton
10 adhesive
13 box body
14 first side surface (one side surface of box body)
17 fourth side surface (another side surface of box body)
20 lid body
21 inserting flap
22 suspension piece
23 suspension hole
28 nozzle
D separation distance
K1 first insertion step
K2 application step
K3 second insertion step
K4 adhesion step

The invention claimed is:

1. A carton production method for a carton including a box body having an upper surface that is opened, a suspension piece extending upward from an upper end of one side surface of the box body, a lid body that is provided so as to be rotatable about an upper end of another side surface of the box body and closes the upper surface of the box body, an inserting flap provided to the lid body and on an opposite side of the upper end of the another side surface of the box body, so as to be inserted in an inner side of the one side surface of the box body, and a suspension hole penetrating the suspension piece, the method comprising:

a first insertion step of rotating the lid body toward the one side surface of the box body to a position where the inserting flap overlaps the suspension hole;

an application step of applying an adhesive to the inserting flap through the suspension hole;

a second insertion step of curving the one side surface of the box body so as to protrude away from the inserting flap, inserting the insertion flap, and closing the upper surface of the box body with the lid body; and an adhesion step of bonding the inserting flap, to which the adhesive is applied, to the inside of the one side surface of the box body.

2. The carton production method according to claim 1, wherein in the application step, the adhesive is discharged from a tip of a nozzle positioned on a side opposite to the inserting flap with respect to the suspension piece toward the inserting flap through the suspension hole, and a separation distance between the tip of the nozzle and the inserting flap is 5 mm or less.

* * * * *